(12) United States Patent
Malhotra et al.

(10) Patent No.: US 8,302,859 B2
(45) Date of Patent: Nov. 6, 2012

(54) APPARATUS, METHOD AND SYSTEM FOR FACILITATING PAYMENT OF MONETARY TRANSACTIONS

(76) Inventors: Kamalini Malhotra, Homebush (AU); Weiyuan Wang, North Epping (AU)

( * ) Notice: Subject to any disclaimer, the term of this patent is extended or adjusted under 35 U.S.C. 154(b) by 0 days.

(21) Appl. No.: 12/937,522

(22) PCT Filed: Apr. 21, 2009

(86) PCT No.: PCT/AU2009/000499
§ 371 (c)(1), (2), (4) Date: Jan. 11, 2011

(87) PCT Pub. No.: WO2009/129568
PCT Pub. Date: Oct. 29, 2009

(65) Prior Publication Data
US 2011/0095086 A1    Apr. 28, 2011

(30) Foreign Application Priority Data

Apr. 21, 2008 (AU) ................................ 2008901937

(51) Int. Cl.
*G06K 5/00* (2006.01)
(52) U.S. Cl. ........................................ 235/380; 235/492
(58) Field of Classification Search .................. 235/380, 235/382, 487, 492
See application file for complete search history.

(56) References Cited

U.S. PATENT DOCUMENTS

| | | | | |
|---|---|---|---|---|
| 2,652,551 | A | * | 9/1953 | Gumpertz et al. ............... 235/47 |
| 5,577,120 | A | | 11/1996 | Penzias |
| 5,845,268 | A | * | 12/1998 | Moore .......................... 705/418 |
| 6,422,459 | B1 | | 7/2002 | Kawan |
| 6,467,685 | B1 | | 10/2002 | Teicher |
| 2004/0254892 | A1 | | 12/2004 | Adamson |
| 2005/0269399 | A1 | | 12/2005 | Bensimon et al. |
| 2009/0070271 | A1 | * | 3/2009 | Sarkissian et al. ............... 705/75 |
| 2010/0059593 | A1 | * | 3/2010 | DeFranco ..................... 235/486 |

FOREIGN PATENT DOCUMENTS

EP   0907154   7/1999

OTHER PUBLICATIONS

European Search Report for Application No. EP 09734227 dated Jan. 12, 2012.

* cited by examiner

*Primary Examiner* — Daniel St. Cyr
(74) *Attorney, Agent, or Firm* — Polsinelli Shughart PC

(57) ABSTRACT

An apparatus, method and system for facilitating payment of a monetary transaction using a card device, the card device comprising a microchip for storing encrypted information including a denomination-specific balance having a plurality of selectable digital monetary amounts associated with a plurality of selectable denominations and a denomination non-specific balance, wherein the card device is rechargeable with further monetary amounts and allows a balance of a transaction to be credited to the card.

20 Claims, 3 Drawing Sheets

APPARATUS, METHOD AND SYSTEM FOR FACILITATING PAYMENT OF MONETARY TRANSACTIONS

CROSS-REFERENCE TO RELATED APPLICATIONS

The present application is a U.S. National Phase patent application under 35 U.S.C. §371 of International Application No. PCT/AU2009/000499, filed on Apr. 21, 2009, which claims priority to Australian Patent Application No. 2008901937, filed on Apr. 21, 2008, both of which are expressly incorporated herein by reference.

FIELD OF THE INVENTION

The present invention relates to cards and payment solution systems used to provide payment for monetary transactions. In particular, but not exclusively, the present invention relates to an apparatus, system and method for facilitating payment of monetary transactions using a card device which stores money in a digital format.

BACKGROUND TO THE INVENTION

Most currencies around the world utilize coins for their smaller denominations of currency. Consequently, people will generally carry both notes and coins to provide payment for cash transactions or as a result of receiving change following payment. As such, wallets and purses have been designed to allow a user to carry currency in the form of both notes and coins. However, it is generally a nuisance to carry coins as they often fall out and become lost, or can become too bulky in large amounts which will result in the wallet/purse deforming in shape.

To avoid the need to carry coins, many people now rely on the use of a debit card or credit card for purchases which will ensure that the exact amount can be paid with no change required. However, there are often times when coins are still required, such as for parking ticket machines or vending machines which may only accept payment via coins. To date, there has not yet been an effective solution which provides a means for eradicating the need to carry coins for all required purposes.

There have also been many cash cards developed in an attempt to alleviate the need to carry cash around. However, these cash cards have presented a number of card processing infrastructure problems which have failed to solve the pitfalls of making cash cards a cost-effective and simple alternative to using cash or debit/credit cards. Though the cash cards are processed using existing ATM and EFTPOS network systems, they are still exposed to considerable surcharges charged by the merchants. In addition, use of these cash cards is often merchant bound, restricted to certain retail outlets or franchise groups.

In this specification, the terms "comprises", "comprising" or similar terms are intended to mean a non-exclusive inclusion, such that a system and/or apparatus that comprises a list of elements does not include those elements solely, but may well include other elements not listed.

OBJECT OF THE INVENTION

It is a preferred object of the present invention to provide an apparatus, method and/or system for facilitating payment of monetary transactions using a card device which stores money in a digital format that addresses or at least ameliorates one or more of the aforementioned problems of the prior art.

It is a preferred object of the present invention to provide an apparatus, method and/or system for facilitating payment of monetary transactions which is rechargeable with further monetary amounts and allows a balance of a transaction to be credited to the card device.

It is a further preferred object of the present invention to provide an apparatus, method and/or system for facilitating payment of monetary transactions which operates via an independent network to process the monetary transactions.

SUMMARY OF THE INVENTION

Generally, embodiments of the present invention relate to an apparatus, method and system for facilitating payment of a monetary transaction.

According to one aspect, although not necessarily the broadest or only aspect, embodiments of the present invention reside in an apparatus for facilitating payment of monetary transactions comprising:

a card device configured to store encrypted information including a denomination-specific balance having a plurality of selectable digital monetary amounts associated with a plurality of selectable denominations and a denomination non-specific balance;

wherein the card device is rechargeable with further monetary amounts and allows a balance of a transaction to be credited to the card.

Suitably, the denomination non-specific balance and the denomination-specific balance are stored on the card device or on a database of a card issuer.

Preferably, the payment is by the card device.

Preferably, the encrypted information includes one or more of the following: unique identification code; a denomination-specific balance; a denomination non-specific balance.

Suitably, the card device is recharged via a recharge terminal by inserting notes and coins or direct debit from a bank account, over the counter by providing notes and coins or direct debit from a bank account, phone, internet or at a card issuer.

Preferably, the recharge terminal allows the user to select one or more of the plurality of selectable digital monetary amounts to be dispensed from the recharge terminal in the form of cash.

Preferably, the digital monetary amounts are uploaded onto the card device in a set ratio or in exact denominations.

Preferably, the digital monetary amounts are dispensed from the denomination-specific balance and/or denomination non-specific balance.

Suitably, the digital monetary amounts dispensed from the denomination-specific balance are selected by a user.

According to another aspect, although again not necessarily the broadest aspect, embodiments of the present invention reside in a method for facilitating payment for monetary transactions including:

reading at a point of sale a card device comprising a denomination-specific balance having a plurality of selectable digital monetary amounts associated with a plurality of selectable denominations and a denomination non-specific balance;

encrypting and transferring a plurality of transaction data associated with the monetary transaction to a server in communication with the point of sale;

interrogating a database of the server to verify details of the transaction; and processing the transaction to debit and/or credit the card device.

Preferably, the plurality of transaction data comprising one or more of the following: a location of a point of sale; a card reader ID; an unique identification code for the transaction.

Preferably, the method including reading the card device via a computational device.

Preferably, the method including storing the plurality of transaction data on an internal storage device of the computational device.

Preferably, the method including transferring the plurality of transaction data from the internal storage device to an external storage device in communication with the computational device.

Preferably, the method including automatically transferring the plurality of transaction data from the internal storage device to a nominated bank for transaction verification and fund clearance via a communications network.

Preferably, the method including manually transferring the plurality of transaction data from the external storage device to a nominated bank for transaction verification and fund clearance via internet or other communications network.

According to another aspect, although again not necessarily the broadest aspect, embodiments of the present invention reside in a computer-implemented method for facilitating payment of monetary transactions, the computer-implemented method including:

implementing computer readable program code components configured to cause reading at a point of sale a card device comprising a non-specific balance having a plurality of selectable digital monetary amounts associated with a plurality of selectable denominations a denomination non-specific balance at a point of sale; and implementing computer readable program code components configured to cause encrypting and transferring a plurality of transaction data associated with the monetary transaction to a server of the card issuer in communication with the point of sale;

implementing computer readable program code components configured to cause interrogating a database of the server of the card issuer to verify details of the transaction; and implementing computer readable program code components configured to cause computer readable program code components configured to cause processing the transaction to debit and/or credit the card device.

According to another aspect, although again not necessarily the broadest aspect, embodiments of the present invention reside in a system for facilitating payment of monetary transactions comprising a card device and a computational device coupled to be in communication with a server of a card issuer via a communications network, the server comprising a database and automated funds clearing system for processing and managing at least one transaction using a denomination-specific balance having a plurality of selectable digital monetary amounts associated with a plurality of selectable denominations and a denomination non-specific balance stored on the card device.

Preferably, the database is a master switch database.

Preferably, the computational device processes the transaction to debit and/or credit the card device.

Preferably, the computational device is in the form of a card reader.

Preferably, the computational device comprises an internal storage device for storing a plurality of transaction data associated with the transaction.

Preferably, the computational device is in communication with an external storage device for receiving and storing the plurality of transaction data from the internal storage device. Suitably, the computational device connects to an appropriate communications network upon detection of the card device.

Preferably, the computational device comprises a smart switch system having a smart switch board and database which enables direct connection between the computational device and the card issuer.

Preferably, the card device is rechargeable with further monetary amounts and allows a balance of a transaction to be credited to the card device.

Further features and forms of the present invention will become apparent from the following detailed description.

BRIEF DESCRIPTION OF THE DRAWINGS

By way of example only, preferred embodiments of the invention will be described more fully hereinafter with reference to the accompanying drawings in which like features have like reference numerals, wherein.

DETAILED DESCRIPTION OF THE INVENTION

Embodiments of the present invention will be described with reference to the apparatus, method and system for facilitating payment of monetary transactions using a card device which stores money in a digital format. However, it should be appreciated that embodiments of the present invention can be used to provide payment for a range of different applications, such as EFTPOS payments, automated pay stations, vending machines, self-serve pay stations, parking meters and the like. It will be appreciated that variations need to be made as required. It is envisaged that the infrastructure for the present invention will be able to be implemented without disturbing or undermining the current networking systems to create a complimenting product and business mechanism, which operates via its own independent network infrastructure. It will be acknowledged that different versions of the system and/or apparatus will be provided to suit different financial transaction systems in each country. However, it is envisaged that the card device will be accepted internationally.

Figure 1A:
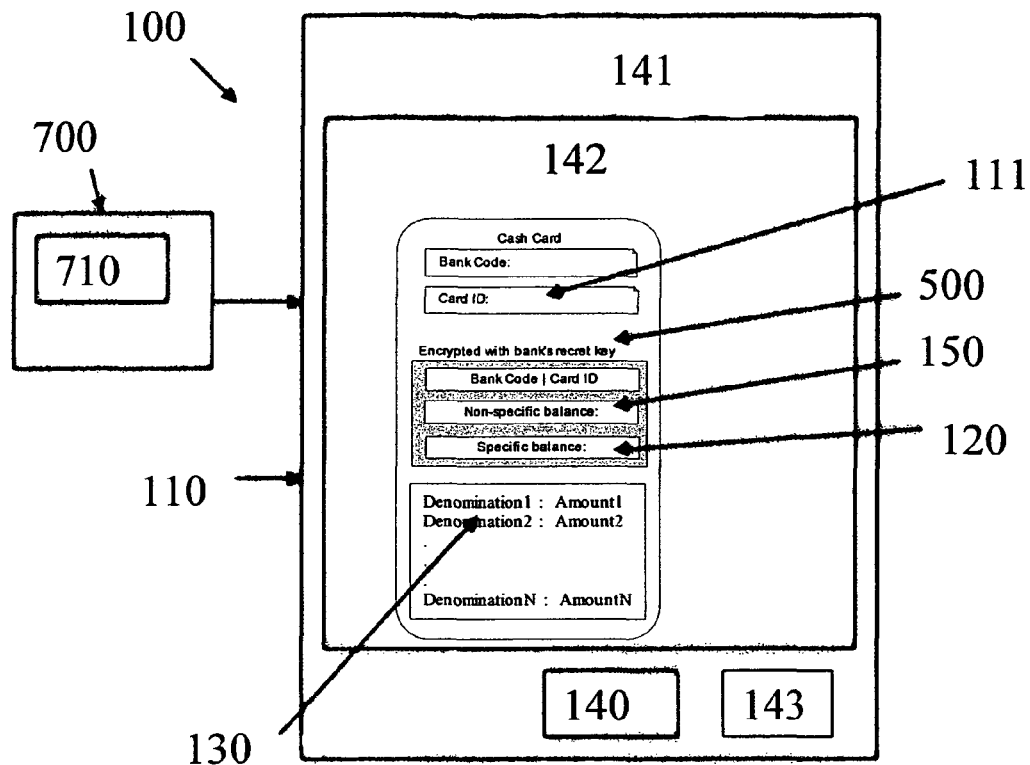
FIG. 1a is an apparatus for facilitating payment of monetary transactions according to embodiments of the present invention.

Referring to FIG. 1, the apparatus 100 for facilitating payment of monetary transactions is provided in accordance with embodiments of the present invention. The apparatus 100 comprises a card device 110 which can be used as a cash card, e-wallet or smart card for various payments. Any suitable form of the card device 110 can be utilized, such as card devices 110 which are contactless, have a magnetic swipe strip or have an integrated circuit or microchip.

The card device 110 is issued by a card issuer 700, such as a bank or other suitable financial institution. Preferably, one bank is responsible for issuing the card device 110 and responsible for holding and clearing all funds. All banks will clear funds with an automated funds clearing system governed by a central master switch database and smart clearing system. In further embodiments of the present invention, the supply and management of the card device 110 can be provided by any other suitable service provider. The card issuer 700 will have an issuer code 710 which can be an IBAN (international bank account number) or Swift Code or any other code capable of identifying the card issuer 700. Preferably, the card device 110 is associated with at least one bank account. The bank account is a nominated account which can be an existing account or a new bank account.

Each card device 110 has a UID (Unique Identification Code) 111 that identifies the card device 110 to banks, financial institutions, merchants, vending machines and other organisations or facilities where the card device 110 is used. The card device 110 comprises at least one asymmetric key 500, shown in FIG. 1, attributed to the card device 110 which is managed by the card issuer. These asymmetric keys function as authentication codes which are verifiable by signal coordination so that the card device 110 will be accepted by EFTPOS facilities and other merchant payment systems.

The card device 110 comprises a denomination-specific balance 120 having a plurality of selectable digital monetary amounts 130. Preferably, the digital monetary amounts 130 are associated with a plurality of selectable denominations. For example, Australian currency would have digital monetary amounts 130 in denominations including one hundred, fifty, twenty, ten and five dollar, two dollar, one dollar, fifty cent, twenty cent, ten cent and five cent denominations.

Preferably, a preset amount of each denomination will be provided to amount to a maximum limit of the card device 110 and the float amount of each denomination will be adjusted upon making a payment or dispensing of the digital monetary amounts 130 or having a balance for a transaction credited to the card device 110. Accordingly, digital monetary amounts 130 can be uploaded onto the card device 110 in a set ratio or in exact denominations, while still observing the preset amounts of each denomination and maximum limit of the card device 110.

Figure 1B:
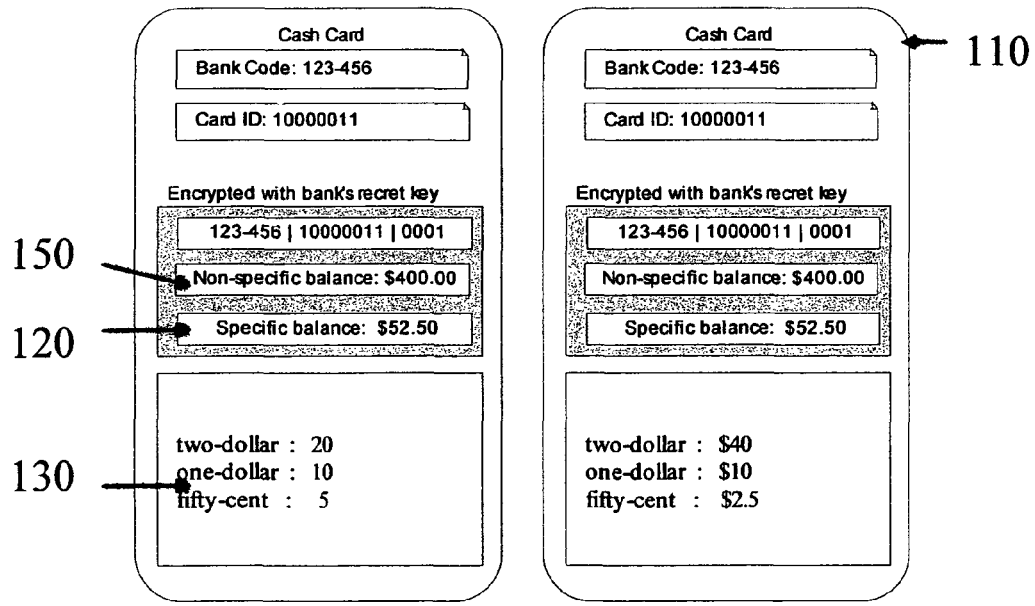
FIG. 1b is a card device of the apparatus of FIG. 1 showing denominations stored as quantities or amounts according to embodiments of the present invention.
Figure 1C:
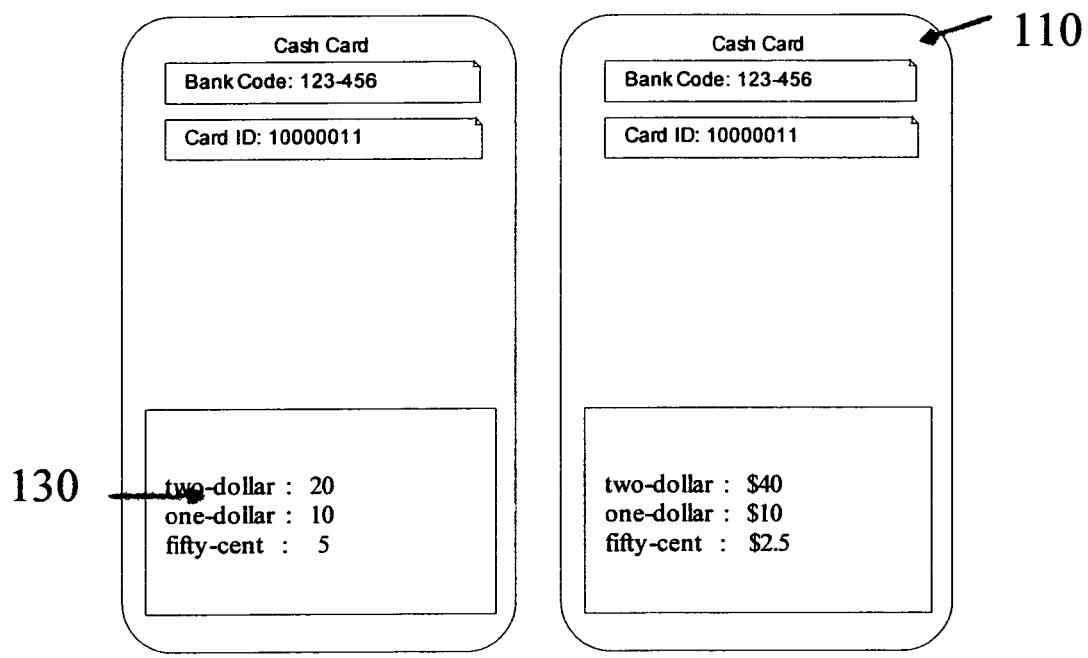
FIG. 1c is an alternative embodiment of the card device of the apparatus of FIG. 1.

The card device 110 has a denomination non-specific balance 150. The non-specific balance 150 is a separate balance which is not related to the total amount of digital monetary amounts 130 stored on the card device 110 and can be paid out like a normal cash or debit card. The denomination non-specific balance 150 accumulates when a balance or refund from a transaction is credited to the card device 110 or when excess digital monetary amounts 130 are uploaded beyond the denomination preset amount up to the maximum limit of the card device 110. For example, if a transaction totaled $19.50 and a digital monetary amount for $20 was selected by a user to be debited from the card device 110, a credit of $0.50 will be credited to the denomination non-specific balance 150 on the card device 110. Alternatively, the $0.50 can be credited as a digital monetary amount 130 for the fifty cent denomination. The denomination non-specific balance 150 is encrypted with the secret key and can only be accessed via the card issuer 400 using an appropriate decryption key. An example of the digital monetary amounts 130, which are stored as quantities or amounts, is shown in FIG. 1b. In an alternative embodiment shown in FIG. 1c, the denomination-specific balance and/or denomination non-specific balance is stored on a database of the card issuer 700.

Figure 3:
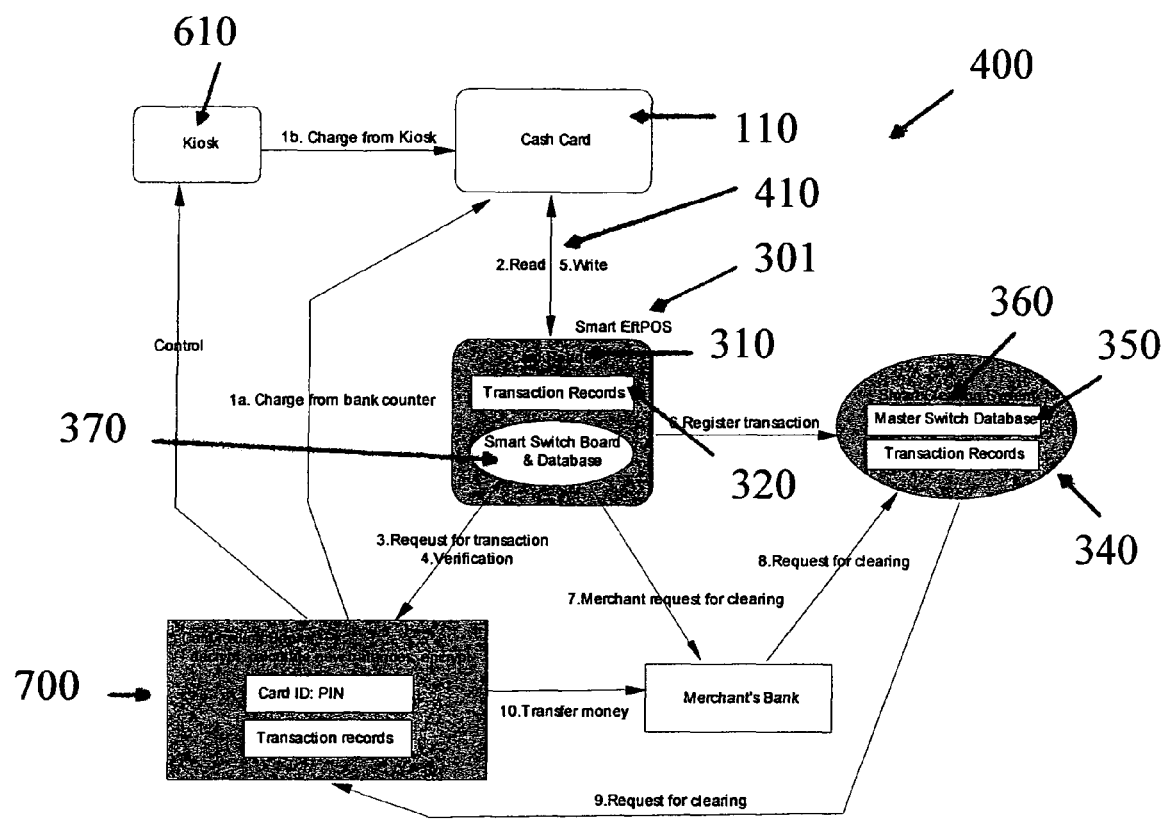
FIG. 3 is a method for facilitating payment of monetary transactions according to embodiments of the present invention.

The card device 110 is rechargeable and can be recharged by paying with cash or debit/credit card at a recharge terminal 610 shown in FIG. 3, over the counter, via phone or internet from a nominated account or at the counter of the card issuer 700. Preferably, the recharge terminal has a sensor which enables it to discriminate between denominations. Preferably, the recharge terminal 610 can also allow a user to select one or more digital monetary amounts 130 to be dispensed as cash by a recharge terminal or Automatic Teller Machines (ATMs) or the like.

The card device 110 can also receive transactions reversed back onto the card device 110 and balance amounts from transactions to the maximum amount of the card device 110. Preferably, the breakdown of the balances on the card device 110 can be displayed to the user.

As illustrated in FIG. 1, the apparatus 100 comprises a microchip or integrated chip 140. However, in an alternative embodiment any other suitable means for storing encrypted information can be utilized. The microchip 140 is also operatively coupled to a storage medium in the form of memory 141. Memory 141 comprises a computer readable medium 142, such as a read only memory (e.g., programmable read only memory (PROM), or electrically erasable programmable read only memory (EEPROM)), a random access memory (e.g. static random access memory (SRAM), or synchronous dynamic random access memory (SDRAM)), or hybrid memory (e.g., FLASH), or other types of memory as are well known in the art.

Figure 2:
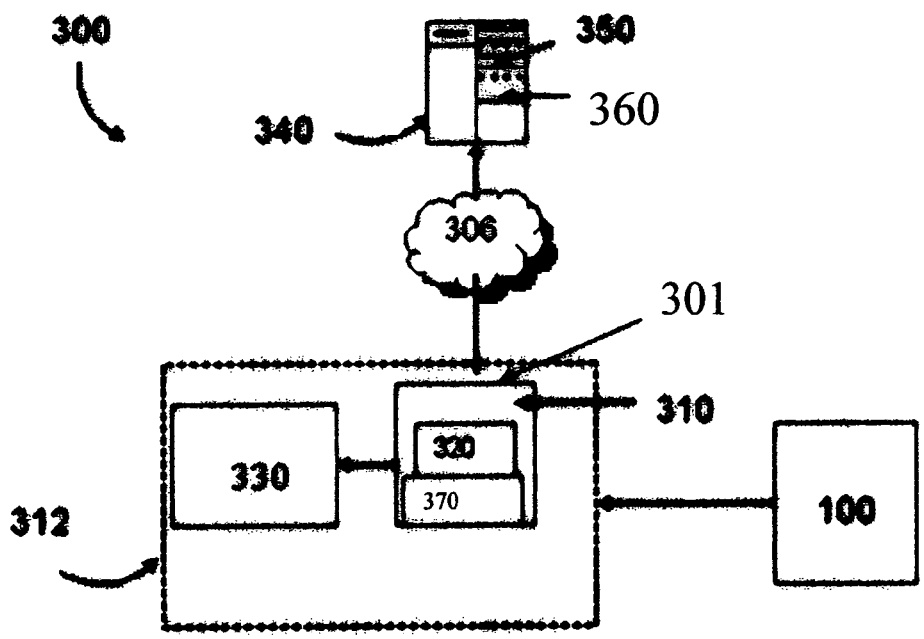
FIG. 2 is a system for facilitating payment of monetary transactions according to embodiments of the present invention.

Referring to FIG. 2, a system 300 for conducting financial transactions is provided in accordance with embodiments of the present invention. The system 300 comprises the apparatus 100 as described above to be in communication with a computational device 301 in the form of a smart EFTPOS terminal via contact, contactless or remote communication links. According to some embodiments, the smart EFTPOS terminal 301 comprises a card reader 310. It will be acknowledged that the smart EFTPOS terminal 301 will have a new exterior design to suit the requirements of the invention.

The card reader 310 is in the Smart EFTPOS terminal 301 which can be located in shops, train stations, car parking, etc, anywhere a current EFTPOS can exist. The Smart EFTPOS terminal 301 is connected via Internet directly to three parties of the card issuing bank, the EFTPOS merchant's bank and the Smart Clearing System that is owned by an independent operating company or a bank. The critical difference of this solution from existing ATM and EFTPOS machines is that the Smart EFTPOS can directly connect to the card issuing bank without passing through the merchant's bank or acquirer where its switch board is often a bottle-neck.

Preferably, the smart EFTPOS terminal 301 comprises a smart switch system having a smart switch board and database 370, provided within the carder reader 310 or in an additional console device which is linked to and shared by the carder reader terminal 310. Upon recognition of the card device 110, the smart switch system will switch the transaction to connect directly to the card issuer for verification and payment processing. The database 350 and automated funds clearing system 360 contains all the Bank Codes and their Internet addresses for transaction processing. The Smart EFTPOS will regularly synchronise a local database of its own with the Master Switch Database 350. A Personal Identification Number (PIN) is an optional security mechanism to implement and may or may not be required in both alternative implementations of the card device shown in FIGS. 1b and 1c.

The smart switch system 370 is preferably in the form of a virtual circuit with switching and routing capabilities. The smart switch system 370 enables a single direct link between the acquirer and the card issuer via an independent network, separate to the existing EFTPOS and ATM network(s). Thus, the card issuer is able to control transactions without any external intervention for better management and access control. Further, the switch system is designed to ease traffic congestion across existing networks and process transactions faster. The card reader 310 comprises an internal storage device 320 for storing and forwarding a plurality of transaction data associated with the monetary transaction.

The card reader terminal 310 is coupled to be in communication with an external storage device 330, such as a USB disk, digital disk drive or flash memory device, via an appropriate connection cable. Preferably, the external storage device 330 has its own UID and name of the bank or financial institution to which it belongs.

The card reader 310 is coupled to be in communication with communications network 312 such as a local area network (LAN) and/or global communications network such as the Internet 306, via conventional wireless and/or wired connections. The card reader 310 is in communication with a server 340 of the card issuer via global communications network 306 and communication network 312 as appropriate.

Preferably, the server 340 comprises a database system 350 and automated funds clearing system 360. The database structure can be divided as follows: national directory, states, zones including east, west, north and south, BSB bank branches and business names. In an alternative embodiment, this structure can be varied to suit other financial systems. The database 350 is interrogated to identify card device 110 and decrypt information stored on the card device 110. In the database 350, all transaction data generated with each card device is received from various banks and is sorted and compiled in order of terminal number and its business name and stored within the business directory. The transaction data is then used for cross-matching with the external storage device 330 for the clearing of funds.

According to some embodiments, the server 340 of the card issuer 700 comprises a software application for the automated funds clearing system 360, which does not require access to mainframe systems. Transaction details, daily transaction summaries and daily settlements can also be transferred in this manner to work directly with the database 350.

Referring to FIG. 3, a method for conducting financial transactions is provided in accordance with embodiments of the present invention. According to some embodiments, the method 400 includes a user at 410 providing a card device 110, which has been obtained from a card issuer 700, at the point of sale for payment of a monetary transaction.

Payment is made from the denomination-specific balance or non-specific balance depending on the type of transaction and/or payment terminal Where payment is made from the denomination-specific balance 130, the user can select the denominations and quantity or amounts of digital monetary amounts 130 from each denomination via a keypad or the like. The Smart EFTPOS terminal 301 will display the values of every selected denomination and as well as a total value of those selected denominations. When the total value equals to or more than the amount to be paid, the card holder can submit the transaction for processing. This allows the card device 110 to be used in a manner which mimics a real wallet/purse to enable the user to feel that they are still handling money.

If the user selects the payment from the denomination non-specific balance 150, no denominations will be displayed or able to be selected. The exact amount required for the purchase will be sent along other data of the transaction for processing. Automatic payment from the denomination non-specific balance 150 can occur by choice of the user or for specific transactions, such as ticket vending machines, which determine the cost to be debited based on an inventory.

The method 400 includes storing the plurality of transaction data on the internal storage device of the card reader 310.

Preferably, the transactions data will be encrypted by the card reader 310 before being transferred to the internal storage device 320 or sent to the server 340 via internet. The method 400 includes separately encrypting each transaction with details including one or more of the following: a transaction UID or unique code; a time of the point of sale; a location of the point of sale; a card reader ID. The transaction data and monetary value will accumulate in the exact order of each transaction on the internal and external storage devices. Preferably, all transaction data will be backed up over a network system onto the database 350 which will temporarily store all the account information for a prescribed period of time. Preferably, the information will automatically be purged from the EFTPOS facility once the transaction has been completed.

The method includes the card device 110 being read by the card reader 310 and the user entering their security key. The transaction data is sent in real-time to the server 340 and database 350 of the card issuer 700 for decryption and validation. The card device 110 will also be checked to ensure there is sufficient balance to complete the transaction. The card device 110 will be declined once the balance has been exhausted.

The method 400 includes debiting funds from the denomination-specific balances 120 or denomination non-specific balance 150 and sending transactions details to the card issuer database 350. The method 400 also includes recording transaction details and data in the internal storage device, exporting the transaction data from the internal storage device 320 to be temporarily remitted on the external storage device 330 and providing the external storage device 330 to the automated funds clearing system 360 for clearing. The internal storage device 330 can therefore be used as a backup tool for data verification. Each transaction can optionally include after-transaction balances for the denomination-specific balance and denomination non-specific balance, which can be utilized to detect duplicate cards.

During transaction processing, the card holder may input a PIN and the Smart EFTPOS terminal 301 will send the encrypted card data (i.e. Bank Code, card ID, LastTxID or Last Transaction ID and denomination-specific and denomination non-specific balances), as well as the PIN if required, along with the transaction details to the card issuer 700 for processing. After the bank checks the PIN (if required), decrypts denomination-specific and denomination non-specific balances and verifies and processes the transaction, it encrypts updated balances along with other details (including new LastTxID) and sends the result back to the Smart EFTPOS terminal 301. The Smart EFTPOS terminal 301 writes the encrypted data onto the card device 110, then later or in real-time registers the transaction details and notifies the merchant's bank.

LastTxID will be checked during verification to check if it is a duplicated transaction or if a duplicated card is in use. If the LastTxID received for a new transaction does not match the last transaction ID in the database 350, the card device or transaction is detected as. In such case, the transaction can be rejected and the card device 110 can be hot-listed as a fraudulent one.

In an alternative embodiment of transaction processing using the card device shown in FIG. 2, the card holder inputs a PIN, the Smart EFTPOS terminal 301 sends the PIN and card ID along with the transaction details to the card issuer 700. The card issuer 700 will check the PIN and the balances 130, 150 from their database, records and verify the transaction.

According to some embodiments, the method 400 includes implementing computer readable program code components 143 for facilitating payment of monetary transactions in accordance with the teachings of the present invention.

In an alternative embodiment, the card device 110 can be used as a normal cash card which can be read using a standard cash card reader.

Hence, the apparatus, method and system of the present invention provides a cost-effective solution for facilitating payment of monetary transactions which bypasses the current ATM and EFTPOS networks to eliminate processing fees normally charged by a clearing house network.

The present invention provides a card device and supporting new network and infrastructure which can easily replace use of cash and coins and will eradicate the need to count, bag and lug coins to the bank to be deposited which will save time and money. It is envisaged that use of the present invention will also lesson health and safety hazards for all retailers and staff connected with heavy weight lifting, metal allergies, metal poisoning and transporting via people and armguards etc.

The present invention provides a payment solutions system which makes it possible to process transactions outside a closed environment such that the card device can be implemented across most payment types including, but not limited to, EFTPOS, mobile EFTPOS, self-serve kiosks, large transport vending machines and small vending machines.

Throughout the specification the aim has been to describe the invention without limiting the invention to any one embodiment or specific collection of features. Persons skilled in the relevant art may realize variations from the specific embodiments that will nonetheless fall within the scope of the invention.

We claim:

1. An apparatus for facilitating payment of monetary transactions comprising:
a card device configured to store encrypted information including a denomination-specific balance having a plurality of selectable digital monetary amounts associated with a plurality of selectable denominations and a denomination non-specific balance;
wherein the card device is rechargeable with further monetary amounts and allows a balance of a transaction to be credited to the card device.

2. The apparatus of claim 1, wherein the encrypted information includes one or more of the following: an unique identification code; a denomination-specific balance; a denomination non-specific balance.

3. The apparatus of claim 1, wherein the card device is recharged via a recharge terminal by inserting notes or coins or direct debit from a bank account, over the counter by providing notes or coins or direct debit from a bank account, phone, internet or at a card issuer.

4. The apparatus of claim 3, wherein the recharge terminal allows the user to select one or more of the plurality of selectable digital monetary amounts to be dispensed from the recharge terminal in the form of cash.

5. The apparatus of claim 1, wherein the digital monetary amounts are stored on a database of a card issuer and uploaded onto the card device in a set ratio or in exact denominations.

6. The apparatus of claim 1, wherein the digital monetary amounts are dispensed from the specific balance and/or denomination non-specific balance.

7. The apparatus of claim 1, wherein digital monetary amounts dispensed from the specific balance are selected by a user.

8. A method for facilitating payment for monetary transactions including:
reading via a computational device at a point of sale a card device comprising a denomination-specific balance having a plurality of selectable digital monetary amounts associated with a plurality of selectable denominations and a denomination non-specific balance;
encrypting and transferring a plurality of transaction data associated with the monetary transaction directly to a server of a card issuer in communication with the point of sale;
interrogating a database of the server to verify details of the transaction; and
processing the transaction to debit and/or credit the card device.

9. The method of claim 8, wherein the plurality of transaction data comprises one or more of the following: a location of the point of sale; a card reader ID; an unique identification code for the transaction.

10. The method of claim 8, including storing the plurality of transaction data on an internal storage device of the computational device, the plurality of transaction data being transferrable from the internal storage device to an external storage device in communication with the computational device.

11. The method of claim 10, including automatically transferring the plurality of transaction data from the internal storage device to a nominated bank for transaction verification and fund clearance via a communications network.

12. The method of claim 10, including manually transferring the plurality of transaction data from the external storage device to a nominated bank for transaction verification and fund clearance.

13. A computer-implemented method for facilitating payment of monetary transactions, the computer-implemented method including:
implementing computer readable program code components configured to cause reading at a point of sale a card device comprising a denomination-specific balance having a plurality of selectable digital monetary amounts associated with a plurality of selectable denominations and a denomination non-specific balance; and
implementing computer readable program code components configured to cause encrypting and transferring a plurality of transaction data associated with the monetary transaction directly to a server of a card issuer in communication with the point of sale;
implementing computer readable program code components configured to cause interrogating a database of the server to verify details of the transaction; and
implementing computer readable program code components configured to cause computer readable program code components configured to cause processing the transaction to debit and/or credit the card device.

14. A system for facilitating payment of a monetary transaction comprising a card device and a computational device coupled to be in communication with a server of a card issuer via a communications network, the server comprising a database and automated funds clearing system for processing and managing at least one transaction using a denomination-specific balance having a plurality of selectable digital monetary amounts associated with a plurality of selectable denominations and a denomination non-specific balance stored on the card device.

15. The system of claim 14, wherein the computational device in the form of a card reader processes the transaction to debit and/or credit the card device.

16. The system of claim 14, wherein the computational device comprises an internal storage device for storing a plurality of transaction data associated with the transaction, the plurality of transaction data being transferrable from the internal storage device to an external storage device in communication with the computational device.

17. The system of claim 14, wherein the card device is rechargeable with further monetary amounts and allows a balance of a transaction to be credited to the card device.

18. The system of claim 14, wherein the database is a master switch database.

19. The system of claim 14 wherein the computational device connects to an appropriate communications network upon detection of the card device.

20. The system of claim 14 wherein the computational device comprises a smart switch system having a smart switch board and database which enables direct connection between the acquirer and the card issuer via an independent network.

* * * * *